3,112,887
PHOTOGRAPHIC AND GRAPHIC MATERIAL
ILLUMINATOR
Emil Brou, Plainview, and Imrich Kujan, Flushing, N.Y.,
assignors to the United States of America as represented by the Secretary of the Army
Filed Sept. 8, 1961, Ser. No. 136,958
4 Claims. (Cl. 240—2)
(Granted under Title 35, U.S. Code (1952), sec. 266)

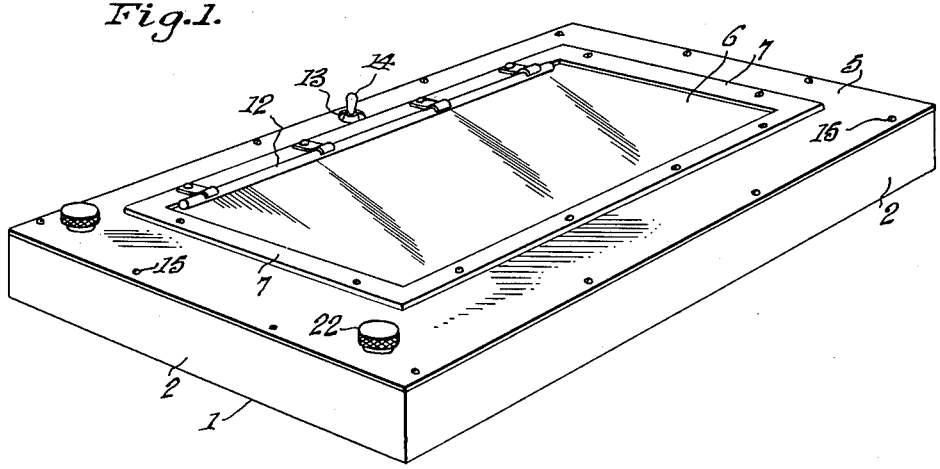
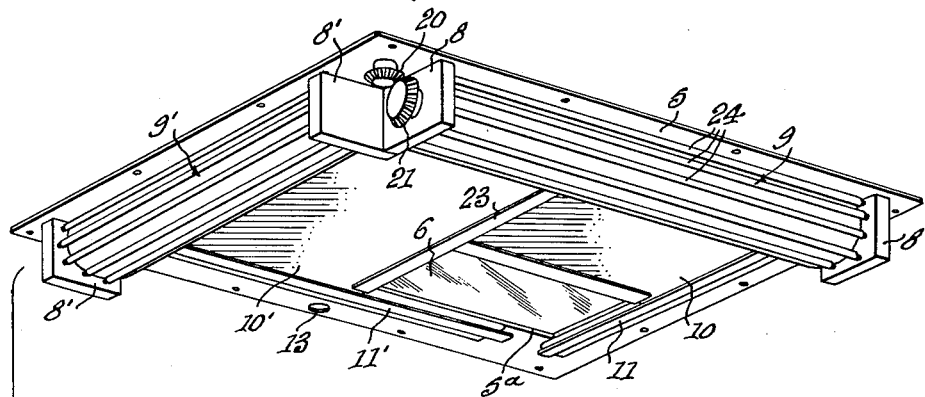
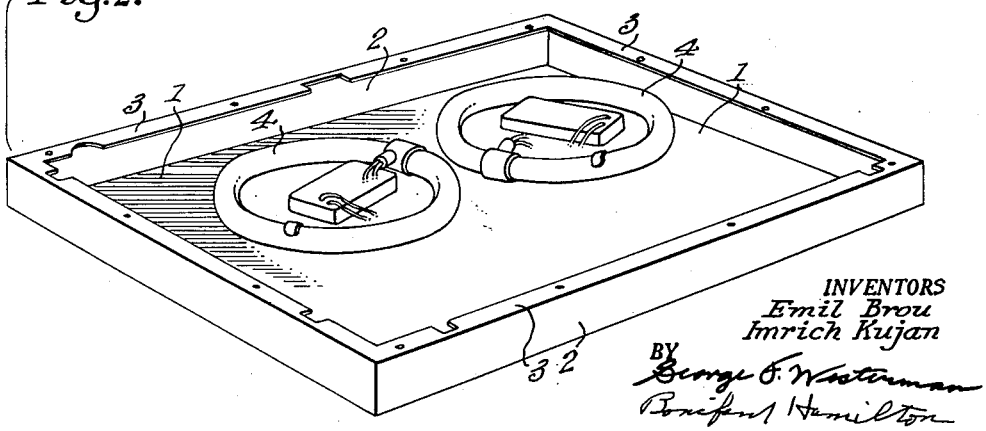

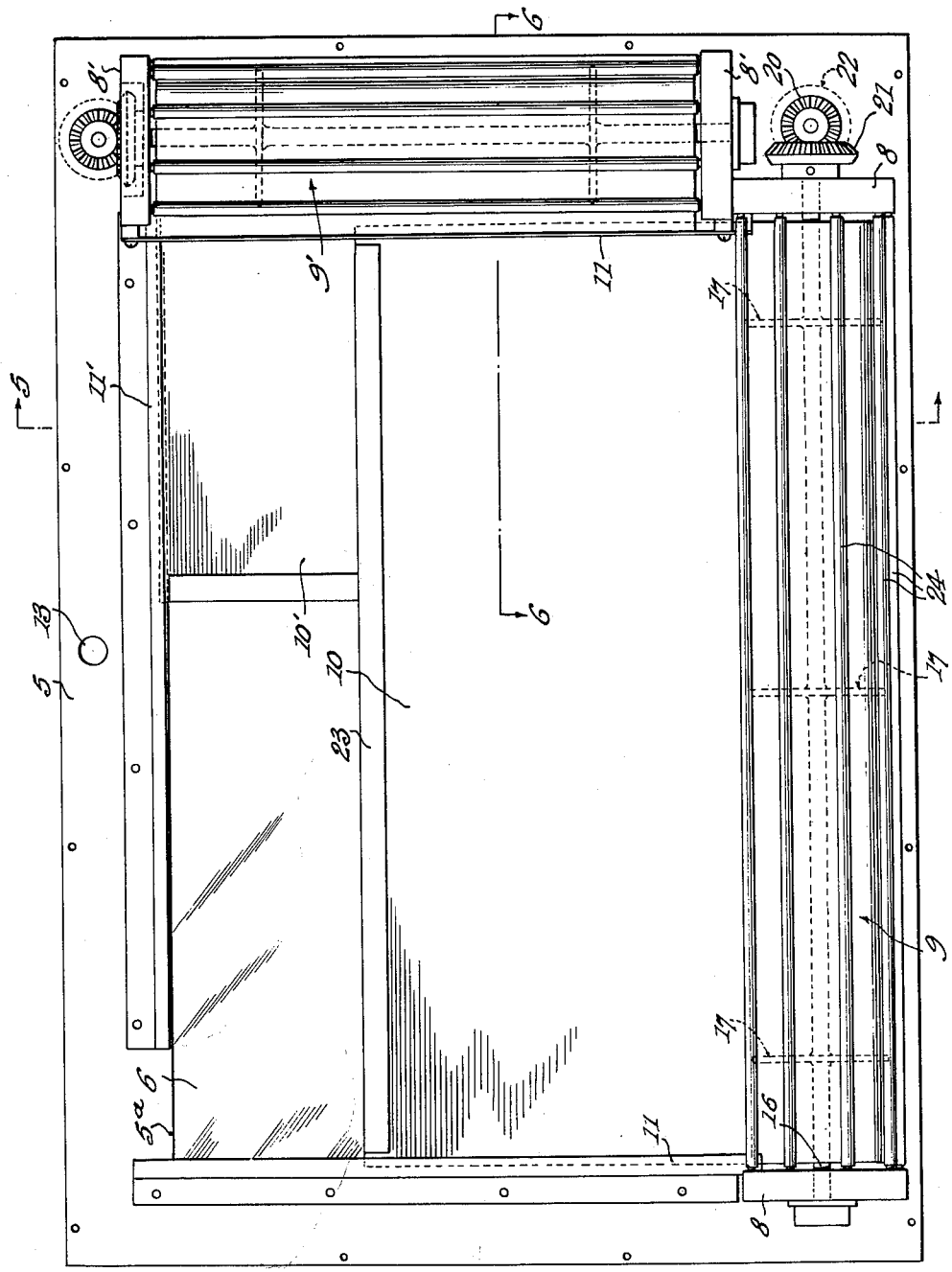

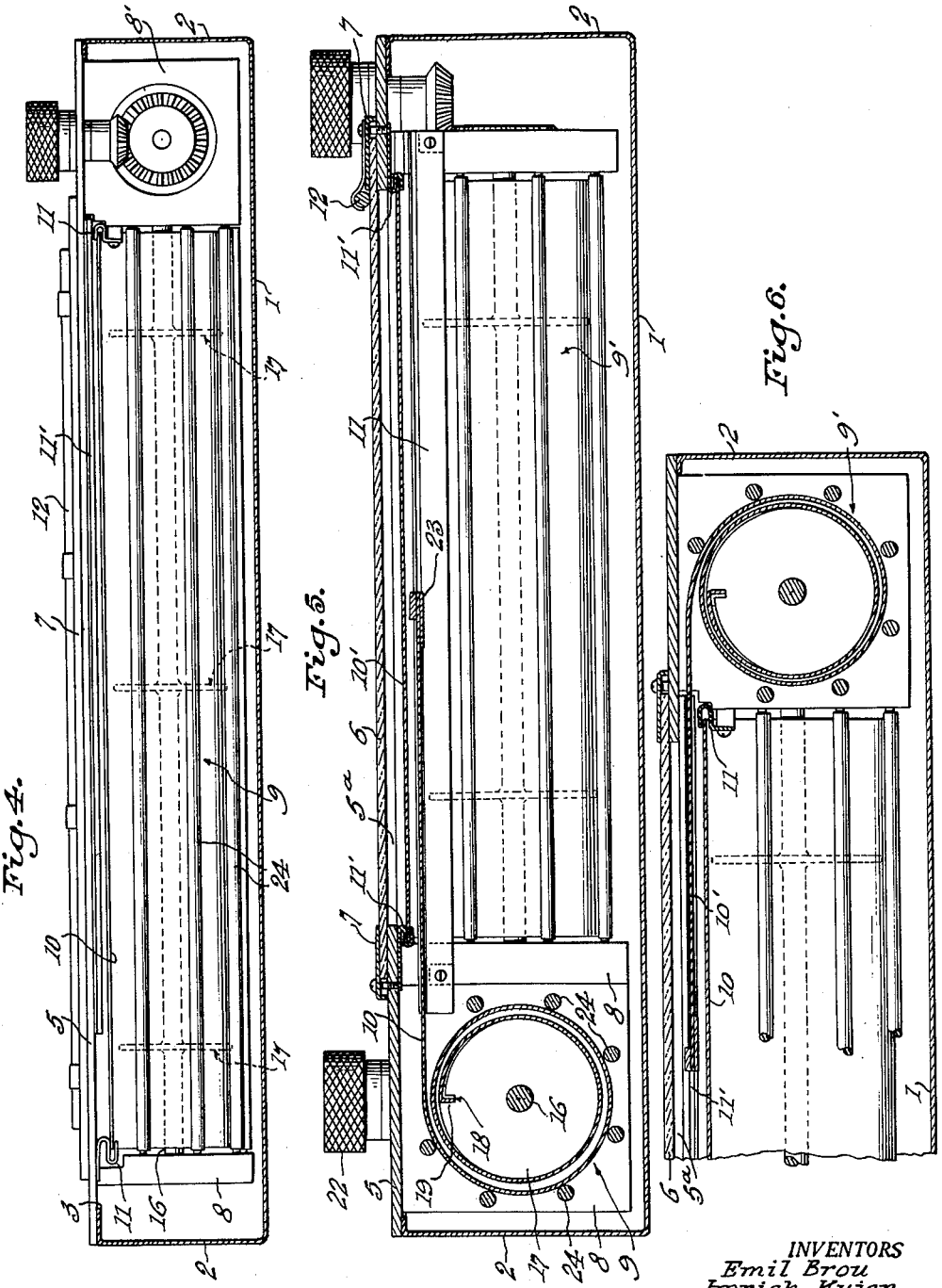

The invention described herein may be manufactured and used by or for the Government for governmental purposes without the payment of any royalty thereon.

The present invention relates to the field of photographic and graphic material exhibitors more particularly to an exhibitor which is especially suited to illuminating X-ray films and plates.

Many different illuminators and light boxes have been devised in which a light is placed behind the object to facilitate the viewing of photographs, drawings, blueprints, X-ray films and the like. Some of these illuminators are portable, others, as in the case of X-ray film illuminators, may be installed in walls or fixtures. One of the problems of constructing such an illuminator is the design of a simple, positive means for covering a portion of the illuminator's viewing screen so that the illuminated portion will correspond in size and shape to the material being viewed.

The primary object of this invention is to provide a photographic and graphic material illuminator having a simple, positive shutter arrangement for reducing the illuminated area of the viewing screen.

Another object is to provide a photographic and graphic material illuminator which may be used either as a portable viewer or as an installed unit in a wall or fixture.

Briefly the invention comprises a light box having a conventional translucent screen illuminated by lamps contained within the box. Two flexible shutters are wound on spooling drums and are so arranged that they may be interposed between the lights and the screen defining an illuminated rectangle whose size and shape depends upon the extent to which the shutters are unwound. The X-ray film or other material to be viewed is held against this illuminated rectangle. To facilitate unwinding of each shutter, a plurality of rod-like rollers are disposed around each spooling drum.

Turning now to the drawings which show our invention in its preferred form:

FIG. 1 is a perspective view of a complete illuminator;

FIG. 2 is an exploded perspective view of an illuminator showing the top portion separated from the bottom container;

FIG. 3 is a view looking underneath the top portion of the illuminator;

FIG. 4 is a side elevation of the illuminator, the bottom container being shown in section; and FIGS. 5 and 6 are sectional views of the illuminator taken along lines 5—5 and 6—6, respectively, of FIG. 3.

Referring back to FIGS. 1 and 2, the invention in its preferred form comprises a rectangular container having a bottom 1 and side walls 2 integrally made to form an open box. The top edges of the container have an inward turning flange 3 which facilitates fastening to the top cover. Within the container and secured to the bottom are two circular fluorescent lamps 4 (shown with starters) which are connected through a control switch 14 to an external source of electricity. The connections, which are conventional, are not shown.

The top cover 5 which closes and completes the container is made of opaque material with a rectangular opening 5a. This opening is covered by a translucent screen 6, preferably made of opalescent plastic, held in place by frame 7. End supports 8 and 8' for spooling drums 9 and 9' respectively, are fastened to the top cover 5 and are so situated that the spooling drums 9 and 9' are aligned with, and are close to, two adjacent sides of the light box. Shutters 10 and 10', made of a flexible material, are so arranged that they may be rolled up on spooling drums 9 and 9', respectively. Two pairs of guide channels 11 and 11' are provided to receive and direct the edges of shutters 10 and 10', respectively, when the shutters are unwound from their spooling drums. These guide channels are perpendicular to their related spooling drums.

The top cover has a spring mounted boundary clip 12 along one edge of the translucent screen to be used in holding material such as an X-ray film in place when it is being viewed. The top cover also has hole 13 to accommodate light switch 14, and is fastened to the container by suitable means 15.

Referring now to FIGS. 3, 4, and 5 for the details of one of the shutters and its operating mechanism, spooling drum 9 comprises shaft 16 to which are affixed several discs 17. Each disc has a slot 18 (FIG. 5) to receive the hooked end 19 of shutter 10; shutter 10 is wound around spooling drum 9. Winding and unwinding of the shutter is accomplished by spur gear 20 and bevel gear 21 which are attached to manually turnable knob 22 and to rotatable shaft 16, respectively.

Several design problems are created by the fact that when in use shutter 10 is forced off spooling drum 9 rather than being pulled off. The shutter although it must be flexible enough to be wound on the spooling drum must also have a certain stiffness if it is to follow guide channels 11 without wrinkling when being unwound from the spooling drum. The necessary stiffness may be obtained by selecting an appropriate material for the shutter or by adding longitudinal stiffening strips to it. The drawing shows an additional stiffening strip 23 across the leading edge of the shutter.

In order to confine and direct the shutter when it is being forced off spooling drum 9, a plurality of freely rotatable rods 24, whose axes are parallel to the axis of the spooling drum, are spaced around the spooling drum roughly on the circumference of a circle somewhat larger in diameter than the spooling drum. In lieu of a circle, the rods may be spaced along a spiral. These rods should turn with minimum friction. In the drawing, the rods are shown as having a reduced diameter at the ends where they bear on supports 8.

The details of construction of the second shutter 10', its spooling drum 9', and operating mechanism can be seen in FIGS. 3, 4, 5, and 6. Because these details are identical to those of the shutter, spooling drum, and operating mechanism already described it will be unnecessary to repeat them.

The manner of using the invention should be obvious from the drawings and from the description already given. As each knob is turned its associated shutter is thrust forward or drawn backward between the lights and the translucent screen thus masking part of the illuminated area of the screen. The leading edges of the two shutters and the opposing edges of frame 7 outline an illuminated rectangle which can be varied to correspond to the size of the X-ray film or other material being viewed.

It will be understood that the illuminator can be built, as described, in its own container so that it is portable or readily installed in a recess in a wall or fixture; or that it can be built as an integral part of a wall or fixture.

Many obvious changes and modifications in design may be made in the illuminator and it may be used for many purposes besides those enumerated without departing from the principle of the invention.

We claim:

1. In a photographic and graphic material illuminator having a source of light and a translucent screen, the combination of rotatable spooling drums, a flexible shutter wound upon each of said spooling drums, means to rotate each of said spooling drums to selectively expel from each spooling drum and rewind upon each spooling drum its associated shutter to juxtaposition with the said translucent screen, a plurality of freely rotatable rods arranged around each spooling drum with their axes parallel to the axis of such spooling drum, guide means to direct each shutter so that as it is unwound from its spooling drum it will reduce the illuminated area of the translucent screen.

2. The photographic and graphic material illuminator recited in claim 1 wherein there is a spooling drum parallel to each of two adjacent edges of the translucent screen, wherein the bearing ends of the said rotatable rods are smaller in diameter than the rest of said rods and carried by bearing members adjacent the ends of said spooling drums and wherein said guide means comprises two pairs of guide channels disposed parallel to the surface of said translucent screen, each pair of said guide channels receiving the lateral edges of one of said flexible shutters.

3. The photographic and graphic material illuminator as recited in claim 1 wherein said source of light is contained in a lower receptacle portion of a separable container and said spooling drums, flexible shutters and translucent screen are carried by a cover portion adapted to be joined to said lower receptacle portion.

4. The photographic and graphic material illuminator as recited in claim 3 further comprising operating controls for said spooling drums carried by said cover portion of said separable container, said operating controls including means mounted externally of said cover portion for selectively expelling from said spooling drums and rewinding upon said spooling drums said flexible shutters.

References Cited in the file of this patent

UNITED STATES PATENTS

| | | |
|---|---|---|
| 1,402,176 | Pagano | Jan. 3, 1922 |
| 1,715,884 | Allen | June 4, 1929 |
| 1,729,955 | Matthaei | Oct. 1, 1929 |
| 2,701,838 | Loesch | Feb. 8, 1955 |
| 2,734,435 | Leonardi | Feb. 14, 1956 |
| 2,817,271 | Roy | Dec. 24, 1957 |